United States Patent
Rankin

(10) Patent No.: US 11,197,485 B2
(45) Date of Patent: Dec. 14, 2021

(54) METHOD TO INHIBIT STORAGE BROWNING IN CHEESE

(71) Applicant: Wisconsin Alumni Research Foundation, Madison, WI (US)

(72) Inventor: Scott A. Rankin, Cross Plains, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 761 days.

(21) Appl. No.: 13/800,068

(22) Filed: Mar. 13, 2013

(65) Prior Publication Data

US 2014/0272033 A1  Sep. 18, 2014

(51) Int. Cl.
A23C 19/10   (2006.01)
A23C 19/097  (2006.01)
A23C 19/068  (2006.01)

(52) U.S. Cl.
CPC .......... *A23C 19/105* (2013.01); *A23C 19/097* (2013.01); *A23C 19/10* (2013.01); *A23C 19/0688* (2013.01)

(58) Field of Classification Search
CPC .............................. A23C 19/10; A23C 19/105
See application file for complete search history.

(56) References Cited

U.S. PATENT DOCUMENTS

| 5,626,893 A | 5/1997 | Reddy |
| 6,090,417 A | 7/2000 | Mehnert et al. |
| 6,406,724 B1* | 6/2002 | Reddy ................ A23L 27/206 426/34 |
| 2008/0138481 A1 | 6/2008 | Ho et al. |

FOREIGN PATENT DOCUMENTS

CH  704 938 B1  11/2012

OTHER PUBLICATIONS

Singh et al., Factors Affecting Flavor Development, Journal of Dairy Science, vol. 53, No. 5, 1970.*
Friedman, Food Browning and Its Prevention: An Overview, vol. 44, No. 3, Mar. 1996.*
Scott, Cheesemaking Practice, 3rd Edition, Robinson and Wilbey, ebook 1988.*
Booth, I. R., G. P. Ferguson, S. Miller, C. Li, B. Gunasekera, and S. Kinghorn. (2003). Bacterial production of methylglyoxal: a survival strategy or death by misadventure? *Biochemical Society Transactions*, 31, 1406-1408.
Divine, R. D., D. Sommer, A. Lopez-Hernandez, and S. A. Rankin. (2012). *Short communication*: Evidence for methylglyoxal-mediated browning of Parmesan cheese during low temperature storage. *Journal of Dairy Science*, 95, 2347-2354.

(Continued)

*Primary Examiner* — Amber R Orlando
*Assistant Examiner* — Philip A Dubois
(74) *Attorney, Agent, or Firm* — Joseph T. Leone, Esq.; DeWitt LLP

(57) ABSTRACT

Described is a method to inhibit browning in aged cheeses and the resulting aged cheese. The method includes the step of adding to a fresh cheese during its manufacture an amount of a reducing agent, wherein the amount of added reducing agent is effective to inhibit methylglyoxal-mediated browning of the cheese as it ages.

17 Claims, 3 Drawing Sheets

(56) References Cited

OTHER PUBLICATIONS

Foulk, J. E. (1993). A fresh look at food preservatives. In J. L. Willis (Ed.), *FDA Consumer* (pp. 22-27). Rockville, MD: Food and Drug Administration.

Friedman, M., and I. Molnar-Perl. (1990). Inhibition of browning by sulfur amino acids 1. Heated amino acid-glucose systems. *Journal of Agricultural and Food Chemistry*, 38, 1642-1647.

Friedman, M. (1996). Food browning and its prevention: an overview. *Journal of Agricultural and Food Chemistry*, 44, 631-653.

Isaac, A., C. Livingstone, A. J. Wain, R. G. Compton, and J. Davis. (2006). Electroanalytical methods for the determination of sulfite in food and beverages. *Trends in Analyical Chemistry*, 25, 589-598.

Jackson, S. F., C. O. Chichester, and M. A. Joslyn. (1960). The browning of ascorbic acid. *Journal of Food Science*, 25, 484-490.

Kalapos, M. K. (1994). Methylglyoxal toxicity in mammals. *Toxicology*, 73, 3-24.

McDonald, S. T. (1992). *Role of α-dicarbonyl compounds produced by lactic acid bacteria on the flavor and color of cheeses*. (Doctoral dissertation). Retrieved from University of Wisconsin, Madison.

Molnar-Perl, I., and M. Friedman. (1990). Inhibition of browning by sulfur amino acids. 2. Fruit juices and protein-containing foods. *Journal of Agriculture and Food Chemistry*, 38, 1648-1651.

Russel, J. B. (1998). Strategies that ruminal bacteria use to handle excess carbohydrate. *Journal of Animal Science*, 76, 1955-1963.

Silva, M. S., A. E. N. Ferreira, A. M. Tomás, C. Cordeiro, A. P. Freire. (2005). Quantitative assessment of the glyoxalase pathway in *Leishmania infantum* as a therapeutic target by modeling and computer simulation. *FEBS Journal*, 272, 2388-2398.

Carreira et al., Pigment producing yeasts involved in the brown surface discoloration of ewes' cheese, *International Journal of Food Microbiology*, 1998, 41:223-230.

Hedrick, T. I., "Spray-drying fills growing user market," Database FSTA (online) International Food Information Service (IFIS), 1983, one page, XP002725863, Database accession No. FS-1985-01-P-0072 *abstract* & Dairy Filed, vol. 166, No. 5, 1983, p. 52, 54, Frankfurt-Main, Germany.

Singh, S, et al., "Factors Affecting Flavor Development in Cheddar Cheese Slurries," Journal of Dairy Science, 1970, pp. 533-536, vol. 53, No. 5, XP002725864, ISSN: 0022-0301.

* cited by examiner

METHOD TO INHIBIT STORAGE BROWNING IN CHEESE

FIELD OF THE INVENTION

Disclosed are methods to inhibit the formation of storage browning and associated off-flavors in cheese in general and hard cheeses such as Parmagiano-Reggiano-type cheeses in particular.

BACKGROUND

Brown pigmentation can occasionally form in cheese, most notably Parmesan cheese, during the ripening process. The browning phenomenon creates an unappealing appearance and associated off-flavors. The browning reactions proceed at refrigerated temperatures and in the relative absence of reducing sugar, which is contrary to typical Maillard browning. The mechanism of the browning process is poorly understood. Residual sugars, lipid oxidation products, byproducts of fermentation, and (or) enzymes may react with primary amines in cheese to form brown pigmentation and concomitantly generate volatile compounds unique to each of these reactions. Determining the volatile profiles provides a means of understanding the potential substrates involved and the causative reaction pathways. Knowing the causative reaction pathways, however, does not provide or suggest a means for preventing the browning reactions.

Methylglyoxal (pyruvaldehyde or 2-oxopropanal; $CH_3$—C(=O)—C(=O)H) is the aldehyde form of pyruvic acid. In many micro-organisms, methylglyoxal is formed as a side-product of several metabolic pathways. It may form from 3-amino acetone, which is an intermediate of threonine catabolism, as well as through lipid peroxidation. However, the most important source is glycolysis. Methylglyoxal arises from non-enzymatic phosphate elimination from glyceraldehyde phosphate and dihydroxyacetone phosphate, two intermediates of glycolysis. Methylglyoxal is highly cytotoxic, thus many organisms include a number of methylglyoxal detoxification reaction pathways.

An advanced glycation end-product (AGE) is the result of a chain of chemical reactions after an initial glycation reaction. The intermediate products are known, variously, as Amadori, Schiff base, and Maillard products, named after the researchers who first described them. (The literature is inconsistent in applying these terms. For example, Maillard reaction products are sometimes considered intermediates and sometimes end products.) Side products generated in intermediate steps may be oxidizing agents (such as hydrogen peroxide), or not (such as beta amyloid proteins). "Glycosylation" is sometimes used for "glycation" in the literature, usually in the phrase "non-enzymatic glycosylation."

SUMMARY

Disclosed herein is a method to inhibit browning in aged cheeses and the resulting aged cheese. The method includes the step of adding to a fresh cheese during its manufacture an amount of a reducing agent, wherein the amount of added reducing agent is effective to inhibit methylglyoxal-mediated browning of the cheese as it ages.

The reducing agent may be added to the cheese in an amount of from about 1 µg to about 500 µg of reducing agent per g of cheese, or from about 1 µg to about 250 µg of reducing agent per g of cheese, or from about 1 µg to about 200 µg of reducing agent per g of cheese; or from about 1 µg to about 100 µg of reducing agent per g of cheese. In one version of the method, the reducing agent contains at least one sulfur atom; the reducing agent may be a thiol. For example, the reducing agent may be selected from the group consisting of glutathione, sodium sulphite, sodium bisulphite (sodium hydrogen sulphite), sodium metabisulphite, potassium metabisulphite, potassium sulphite, calcium sulphite, calcium hydrogen sulphite, potassium hydrogen sulphite, sodium thiosulphate, and combinations thereof. Reducing agents and anti-oxidants having an E number of from E300 to E399 may be used in the method.

Also disclosed herein is an aged cheese produced by adding to a fresh cheese during its manufacture an amount of a reducing agent, wherein the amount is effective to inhibit methylglyoxal-mediated browning of the cheese. Any of the reducing agents listed previously may be used to make the cheese.

The principal benefit of the method is that it prevents or inhibits the browning of the cheese as it ages and also prevents the formation of off-flavors and odors associated with the browning process. The resulting cheese has desirable color, odor, and flavor, and thus retains its value in the food markets.

DETAILED DESCRIPTION OF THE INVENTION

A pathway for the development of brown pigmentation and concomitant flavors during cheese ripening has been attributed to the formation of methylglyoxal, an α-dicarbonyl resulting from microbial metabolism (Divine, et al., 2012; McDonald, 1992). It has been discovered that methylglyoxal will react with proteins in chemical pathways similar to the Maillard reaction, yet at reduced temperatures (e.g. 16° C.). Such browning has significant detrimental effects on the flavor and appearance character potentially lowering the economic value of cheeses so affected. Because low-temperature, methylglyoxal-based browning is different than typical Maillard reactions that proceed only very slowly below 80° C., it presents a unique issue for cheese manufacturers seeking to control such activity.

Methylglyoxal is most commonly formed as an intermediate in the methylglyoxal pathway, a bypass of more common glycolytic pathways. See FIG. 1, which is a reaction pathway depicting the formation and metabolism of methylglyoxal. Other routes for methylglyoxal formation may involve pathways for acetone metabolism and amino acid breakdown (Kalapos, 1994). The methylglyoxal pathway can occur in prokaryotes as an alternative to the Embden-Meyerhof-Parnas pathway (EMP pathway). Unlike the EMP pathway, however, the methylglyoxal pathway does not produce any energy in the form of ATP and is thought to be a mode of recycling phosphate (Booth et al., 2003; Russel, 1998).

Figure 1:
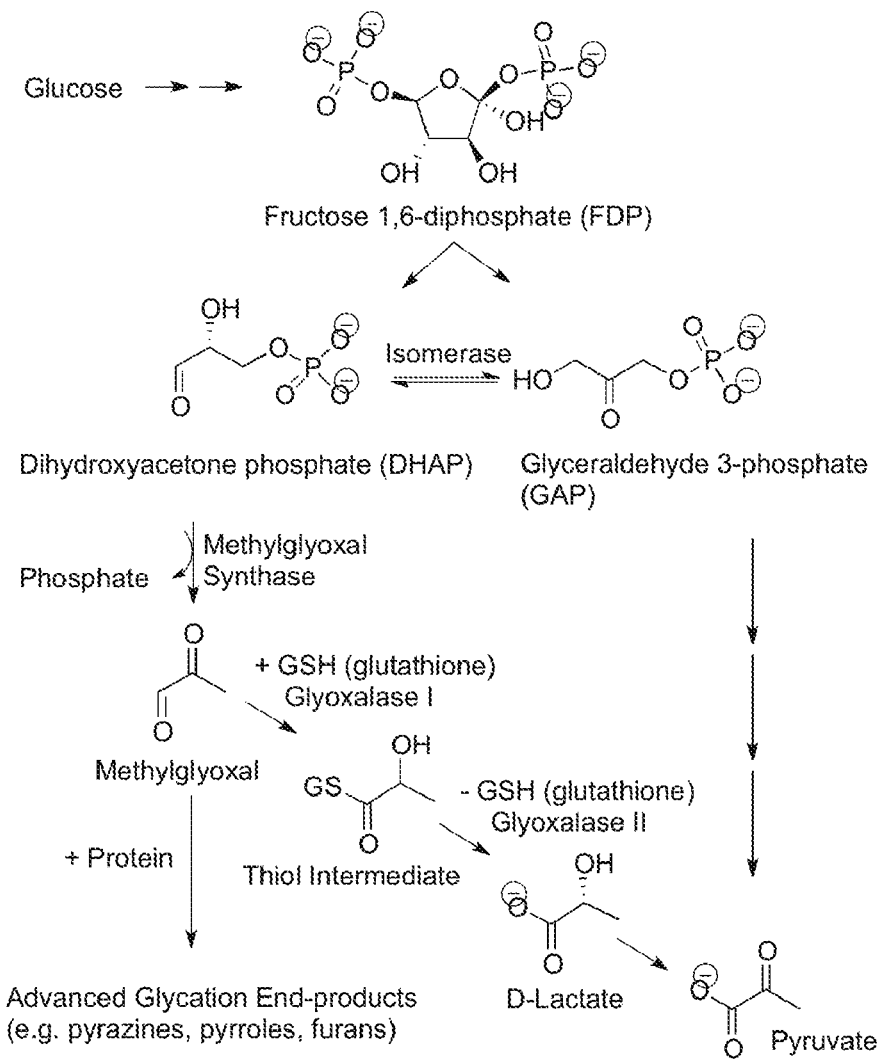
FIG. 1 is a reaction scheme depicting routes for bacterial synthesis of methylglyoxal and its metabolism.

Referring to FIG. 1, in glycolysis, fructose-1,6-diphosphate is broken down by an aldolase to form dihydroxyacetone phosphate (DHAP) and glyceraldehyde 3-phosphate (GAP). In the EMP pathway, triose phosphate isomerase will convert the DHAP into GAP and the two newly formed GAP equivalents will continue to be catabolized to form pyruvate. See the right-hand reaction pathway in FIG. 1. In the methylglyoxal pathway, shown on the left-hand side of FIG. 1, the enzyme methylglyoxal synthase proceeds to catalyze the formation of methylglyoxal from DHAP. From there, methylglyoxal is metabolized to other intermediates via the glyoxalase system, and is eventually converted to pyruvate. The glyoxalase system is thought to exist in many organisms as a means of protection against methylglyoxal's ability to interact with and degrade critical functional proteins in the cell (Booth et al., 2003).

Starter cultures typically used in cheese production, e.g. *Lactobacillus helveticus,* have been shown to produce 0.2 µg of methylglyoxal per mL of MRS media modified to simulate cheese during early ripening (McDonald, 1992). ("MRS media" is a bacterial growth medium specifically designed to support the growth of Lactobacilli; it is named for its developers, de Man, Rogosa and Sharpe.)

Excess methylglyoxal intermediates may react with amine groups, forming advanced glycation end-products (AGEs) and brown pigmentation similar to what is produced by the Maillard reaction. See lower-left of FIG. 1. Methylglyoxal has specifically been shown to react with proteins (e.g., casein) and free amino acids (Kalapos, 1994). This type of protein-diketone reaction yields brown pigmentation and volatiles, such as alkylpyrazines (Divine et al., 2012; McDonald, 1992).

In Parmesan cheese, it was found that the concentration of methylglyoxal fell as the cheese browned during aging. Thus it was hypothesized that methylglyoxal had reacted with free amino acids in the cheese to form brown pigmentation (McDonald, 1992). The research also suggested that a concentration of 2 to 3.5 µg methylglyoxal per g cheese (after pressing) was necessary for the formation of brown pigmentation during aging (McDonald, 1992).

Prior proposed solutions to prevent methylglyoxal-induced browning of Parmesan cheese include choosing proper starter cultures and reducing contamination from other bacteria (McDonald, 1992). Though most commonly used starter cultures (e.g. *L. helveticus*) may produce methylglyoxal, the starter cultures alone are unlikely to produce a sufficient concentration of methylglyoxal to cause browning. Rather, the working hypothesis that led to the present method is that contamination of cheese with wild-type lactic acid bacteria during processing is responsible for the higher concentration of methylglyoxal. This hypothesis is consistent with the observation that less browning occurrs in brine-salted cheese than direct-salted cheese and that more diacetyl (another α-dicarbonyl similar to methylglyoxal) is produced during aerobic conditions (McDonald, 1992). Because consistent color and flavor is critical to the successful manufacture of important cheese varieties, there is a need to establish a means of controlling methylglyoxal-based browning reactions during the cheese-aging process.

Thus, in the present approach, methylglyoxal-mediated browning is inhibited by adding chemical reducing agents directly to cheese during the cheese-manufacturing process. The effect of the added reducing agent is to inhibit or to prevent methylglyoxal from interacting with amine groups. For example, many sulfur-containing compounds are effective reducing agents and are also FDA-approved and generally regarded as safe (GRAS), such as the salt sodium bisulfite and the tripeptide glutathione. (See below for a further discussion of the GRAS designation.) Other antioxidants, such as erythorbic acid, ascorbic acid, and the like also show functionality in inhibiting browning as cheeses are aged.

Figure 2:
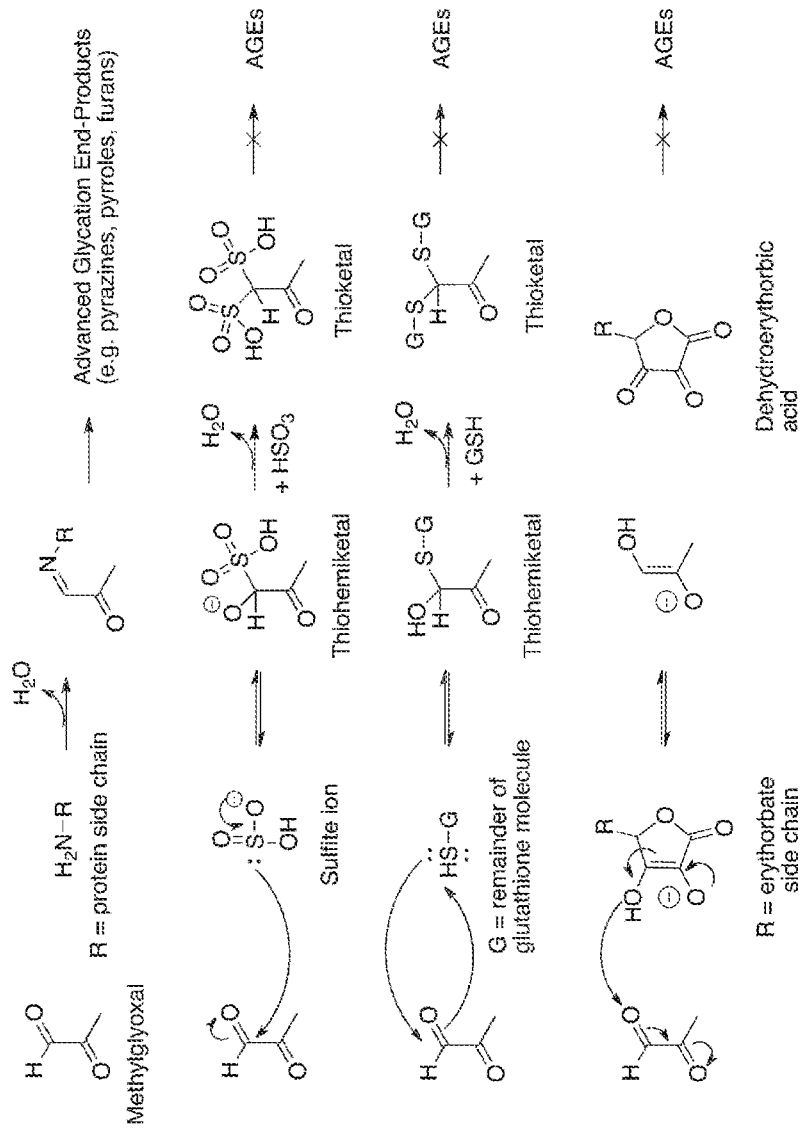
FIG. 2 is a reaction scheme depicting proposed pathways for methylglyoxal deactivation by sulfite ion, glutathione, and erythorbic acid.

FIG. 2 shows potential chemical reactions of methylglyoxal with either protein or the anti-browning compounds. These mechanisms are modeled after similar pathways in the literature, but substitute the aldehyde group of a reducing sugar with that of methylglyoxal (Friedman and Molnar-Perl, 1990; Isaac et al., 2006). In typical Maillard browning, the amine functional group of protein will condense with the aldehyde of reducing sugars or other substrates, forming N-substituted glycosylamines that may eventually form AGEs (Isaac et al., 2006). Without being limited to a specific underlying mechanism, it is believed that the anti-browning agents used in the examples below prevent this reaction by modifying the aldehyde of methylglyoxal before it can react with protein. Due to the high reducing potential of sulfur, it is thought that the sulfur-containing compounds act as nucleophiles and donate electrons to methylglyoxal's aldehyde carbon (Friedman, 1996). The resulting sp3-hybridized carbon can no longer act as a strong electrophile and thus will not condense with the amino groups of protein.

The mechanism of erythorbic acid, which in cheese would be in the form of erythorbate due to its low pKa of 2.1, is expected to be similar to that of its stereoisomer, ascorbic acid. Because the reaction is reversible, however, the anti-browning effect of erhthorbate is not as pronounced as the sulfur-containing compounds.

Given the complexities of these browning reactions and the various chemical mechanisms potentially affected or altered by such reducing agents, it was hypothesized that reducing agents would function to prevent or inhibit methylglyoxal-mediated browning in cheese if added to the cheese during the cheese-manufacturing process. The reducing agents would then be present in the aging cheese to react with methylgloxal formed during the aging process.

Thus, any reducing agent may be used in the process so long as it is capable of either inhibiting the formation of methylglyoxal, or reducing at least a portion of methylglyoxal present in cheese or formed in cheese during the aging process, or preventing methylgloxal from reacting with the amine groups of protein. The additive, of course, must be safe for use in food destined for human and/or animal consumption, although it need not be currently listed as GRAS.

In the United States, the Food & Drug Administration ("FDA") is tasked by Congress to regulate food safety. The FDA maintains a Food Additive Status List, in addition to a list of food additives that have been designated "GRAS"—Generally Regarded as Safe. The Food Additives Status List, formerly called Appendix A of the Investigations Operations Manual (IOM), organizes additives found in many parts of Title 21 of the U.S. Code of Federal Regulations ("CFR") into one alphabetized list. Additives included are those specified in the regulations promulgated under the Federal Food, Drug, and Cosmetic Act ("FD&C Act"), under Sections 401 (Food Standards), and 409 (Food Additives). The Food Additives Status List includes short notations on use limitations for each additive. For complete information on use limitations for any given food additive, the FDA also has promulgated specific regulations for each substance. New regulations and revisions are published in the current issue of the Federal Register as promulgated. Additional information on food additives is also included in the Food Ingredient and Packaging inventories in the Foods section of the FDA web site. For example, the FDA maintains a continuously updated database known as the EAFUS list (Everything Added to Food in the United States). The EAFUS list is a helpful reference database regarding many additives approved for use in food in the United States. Any reducing agent present on the Food Additive Status List may be used in the disclosed method.

The FDA Food Additive Status List, however, is not an exhaustive list of additives that can be used in foods. It specifically omits certain categories of additives, including reducing agents/anti-oxidants that may be used in the presently disclosed method. Specifically excluded from the Food Additive Status List (among several other categories of food additives) are obviously safe substances not cited in a regulation as Generally Recognized as Safe (GRAS). Such substances are listed in the GRAS Notice Inventory maintained by the FDA on its web site. (See below for a further discussion of GRAS.) The GRAS Notice Inventory contains notices received from companies since 1998 and FDA's responses to the notices. The Food Additive Status List also excludes synthetic flavoring substances, which are listed separately in 21 CFR § 172.515.

Inexplicably, the FDA does not compile or publish a complete list of flavorings (some of which are also reducing agents) that are permissible for use in food in the United States. Certain trade groups such as the Flavor Extract Manufacturers Association have established expert panels to evaluate and make determinations on the GRAS status of their products. (Flavor Extract Manufacturers Association, 1620 I Street NW, Suite 925, Washington, D.C. 20006; www.femaflavor.org.) The FDA does offer case-by-case guidance to help determine the acceptability of new food additives through its Center for Food Safety and Applied Nutrition, Office of Food Additive Safety (CPK-2 Bldg. Room 3044, 4300 River Road, College Park, Md. 20740).

As noted above, "GRAS" is an acronym for the phrase Generally Recognized As Safe. Under sections 201(s) and 409 of the FD&C Act, any substance that is intentionally added to food is a food additive that is subject to premarket review and approval by FDA. An exception, however, is made for substances that are generally recognized, among qualified experts, as having been adequately shown to be safe under the conditions of their intended use. Under sections 201(s) and 409 of the Act, and FDA's implementing regulations in 21 CFR § 170.3 and 21 CFR § 170.30, the use of a food additive may be designated GRAS either through scientific procedures or, for a substance used in food before 1958, through experience based on common use in food. Under 21 CFR § 170.30(b), general recognition of safety through scientific procedures requires the same quantity and quality of scientific evidence as is required to obtain approval of the substance as a food additive and ordinarily is based upon published studies, which may be corroborated by unpublished studies and other data and information. Under 21 CFR §§ 170.30(c) and 170.3(f), general recognition of safety through experience based on common use in foods requires a substantial history of consumption for food use by a significant number of consumers.

On Apr. 17, 1997, the FDA issued a proposed rule (the GRAS proposal; 62 FR 18938) that established a notification procedure whereby any person may notify FDA of a determination by that person that a particular use of a substance is GRAS. The GRAS notification program provides a voluntary mechanism whereby a person may inform FDA of a determination that the use of a substance is GRAS, rather than petition FDA to affirm that the use of a substance is GRAS. The FDA database containing this information is called the GRAS Notice Inventory. It is currently available online at http://www.accessdata.fda.gov/scripts/fcn/fcnNavigation.cfm?rpt=grasListing.

The GRAS Notice Inventory provides the following information about GRAS notices filed since 1998: the name of the substance, the file number, and a hyperlink to the letter the FDA sent in response to the notice. The file number for each GRAS notice also serves as a hyperlink to additional information corresponding to the proposed "GRAS exemption claim" (21 CFR 170.36(c)(1)), including the following information, which is also available on the FDA's website: the name of the person who made the GRAS determination, his or her address, the intended conditions of use of the substance, and the statutory basis for the GRAS determination. Additional information that can be obtained from the FDA (although not necessarily through its website) includes: The date when FDA filed the notice, the date when the evaluation process came to a close, a hyperlink to additional correspondence that FDA has issued regarding the GRAS notice, and the petition number if the substance was originally the subject of a GRAS petition. According to the FDA, the GRAS Notice Inventory is updated approximately monthly. Any reducing agents within the GRAS Notice Inventory may be used in the present method.

In the European Union and Switzerland, the European Food Safety Authority (EFSA) is tasked with regulating the safety of food and the food chain. EFSA is an agency of the European Union that provides independent scientific advice and communication on existing and emerging risks associated with the food chain. EFSA was created by European Regulation 178/2002. EFSA's regulatory authority covers all matters with a direct or indirect impact on food and feed safety in the EU, including animal health and welfare. Thus, the EFSA's regulatory mandate in the EU is very similar to that of the FDA in the US.

EFSA has implemented a set of "E numbers," which are codes for chemicals which can be used as food additives for use within the European Union and Switzerland. Food additives assigned an E number by the EFSA are, for all practical purposes, categorically the same as food additives designated GRAS under the US regulatory scheme. EFSA's unified list for food additives was first promulgated in 1962 for food coloring agents. In 1964, preservatives were added to the list. Antioxidants, emulsifiers, stabilisers, thickeners and gelling agents were added in 1974.

For purposes of the present process, the antioxidants listed under E300 to E399 may be used in the present process. Divided broadly into classes, these compounds include:

E300 to E305 ascorbates;
E306 to E309 tocopherols;
E310 to E319 gallates & erythorbates;
E320 to E329 lactates;
E330 to E339 citrates & tartrates;
E340 to E349 phosphates;
E350 to E359 malates & adipates;
E360 to E369 succinates & fumarates; and
E370 to E399 all others.

More specifically, the following reducing agents and antioxidants may be used in the present process. Note that the following list is exemplary, and not an exhaustive list.

E300 ascorbic acid;
E301 sodium ascorbate;
E302 calcium ascorbate;
E303 potassium ascorbate;
E304 fatty acid esters of ascorbic acid (e.g., ascorbyl palmitate);

E305 ascorbyl stearate;
E306 tocopherols (natural);
E307 alpha-tocopherol (synthetic);
E308 gamma-tocopherol (synthetic);
E309 delta-tocopherol (synthetic);
E310 propyl gallate;
E311 octyl gallate;
E312 dodecyl gallate;
E313 ethyl gallate;
E314 guaiac resin;
E315 erythorbic acid;
E316 sodium erythorbate;
E317 erythorbin acid;
E318 sodium erythorbin;
E319 tert-butylhydroquinone;
E320 butylated hydroxyanisole;
E321 butylated hydroxytoluene;
E323 anoxomer;
E324 ethoxyquin;
E325 sodium lactate;
E326 potassium lactate;
E327 calcium lactate;
E328 ammonium lactate;
E329 magnesium lactate;
E330 citric acid;
E331 sodium citrates, e.g., mono-, di-, and tri-sodium citrate;
E332 potassium citrates, e.g., monopotassium citrate, tripotassium citrate;
E333 calcium citrates, e.g., mono-, di-, and tri-calcium citrate;
E334 tartaric acid;
E335 sodium tartrates;
E336 potassium tartrates;
E337 sodium potassium tartrate;
E338 orthophosphoric acid;
E339 sodium phosphates; and
E340 potassium phosphates;

Thiols and other sulfur-containing reducing agents may also be used in the present method. Glutatione is one such reducing agent. Others, and their respective E numbers, include:
E221 sodium sulphite;
E222 sodium bisulphite (sodium hydrogen sulphite);
E223 sodium metabisulphite;
E224 potassium metabisulphite;
E225 potassium sulphite;
E226 calcium sulphite;
E227 calcium hydrogen sulphite;
E228 potassium hydrogen sulphite; and
E539 sodium thiosulphate The process will work with any type of cheese, but is particularly beneficial for use with the relatively harder, low-moisture cheeses typically used for grating or shredding. These types of cheese include, but are not limited to Asiago, Grana Padano, Parmigiano-Reggiano (i.e., Parmesan), and Pecorino Romano cheeses. Other cheese types that benefit from the present method include Edam, Cheddar, Red Leicester, and Cheshire cheeses.

EXAMPLES

The following examples are included to provide a more complete disclosure of the process described and claimed herein. The examples are not intended to limit the scope of the claims in any fashion.

Three Parmesan cheeses were acquired from various suppliers to represent standard cheeses commonly available at the supermarket. Cheese samples were ground in a blender (Vita-Mix, Cleveland, Ohio) on high for 20 s. The ground cheeses (2.0 g samples) were divided among treatment conditions into 8 mL glass vials with Teflon septa and plastic screw caps (Supelco, Bellefonte, Pa.). Each vial was treated with 8.6 µL of a 40% aqueous methylglyoxal solution (Sigma-Aldrich, St. Louis, Mo.) equivalent to 2.0 mg methylglyoxal/g cheese. Higher concentrations of methylglyoxal than typical biological levels were used to accelerate the reaction. Anti-browning compounds were added at a molar ratio of either 2:1 or 4:1 (treatment compound to methylglyoxal); this corresponds to approximately 11.5 and 23 mg $NaHSO_3$ (Fisher Scientific, Fair Lawn, N.J.), 34.1 and 68.2 mg glutathione (Sigma-Aldrich, St. Louis, Mo.), or 19.6 and 39.2 mg D-(−)-isoascorbic acid (Sigma-Aldrich, St. Louis, Mo.), respectively. One negative control treatment had no methylglyoxal or anti-browning compounds added (henceforth referred to as the "control" treatment) and another positive control treatment had methylglyoxal but lacked any anti-browning agent (referred to as the methylglyoxal treatment). Vials were sealed then incubated 10° C. (aging temperature) for 6 d. The degree of browning was determined through colorimetry. Color was determined via the CIE Lab method, which measures color on three different axes: L* (dark to light), a* (green to red), and b* (blue to yellow). Brown pigmentation generally corresponds with lower L* values along with higher a* and b* values. A Colorflex 45°/0° colorimeter with a 1.25 cm diameter aperture (HunterLab, Reston, Va.) was used to make colorimetry readings. The colorimeter was standardized before each set of readings with black and white HunterLab color standards. Samples were read in a 64 mm glass sample cup at times of 0, 3, and 6 d. All measurements were performed in triplicate. Statistical analysis was performed to determine significant mean differences and factor effects at a <0.05 (Table 2; JMP Vs. 7.0.1, SAS Institute Inc., Cary, N.C.).

Results from the colorimetry trials are reported in Table 1. Darker cheeses that have undergone browning are described by low L* (lightness) and high a* (red) and b* (yellow) values, whereas white cheeses have higher L* and lower a* and b* values. A single value of total color change, referred to as ΔE, is calculated as $\Delta E + \sqrt{[(\Delta L^*)2 + (\Delta a^*)2 + (\Delta b^*)2]}$; large ΔE represents an increase in browning.

Figure 3:
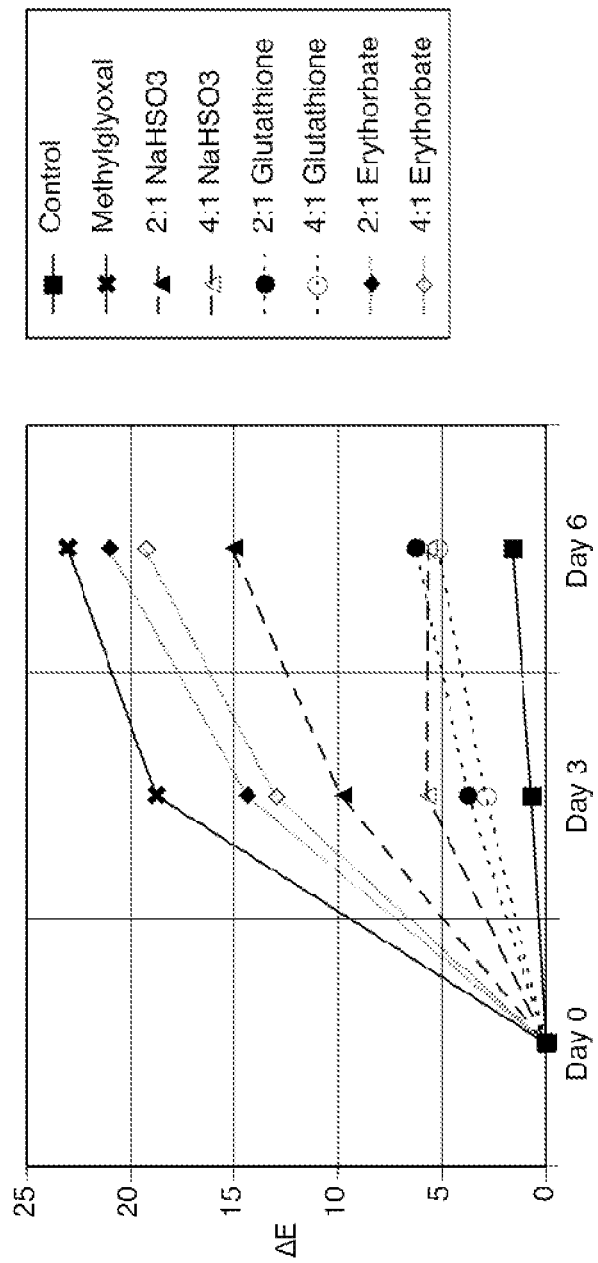
FIG. 3 is a graph depicting color change (ΔE) of different cheese trials over time (0, 3, and 6 d). High ΔE values are consistent with increased browning.

FIG. 3 shows the change in ΔE values over time for each condition. Control cheese, without any added substrate, had little color change, evidenced by a low ΔE of 0.69 and 1.60 at 3 and 6 d, respectively. Cheese in the methylglyoxal condition, without added anti-browning agents, had the most significant color changes of 18.6 (3 d) and 23.0 (6 d). Addition of glutathione at 2:1 or 4:1 molar ratios (glutathione to methylglyoxal) proved to be the most effective, as both treatments had low color changes over time; the 2:1 treatment had a ΔE of 3.73 (3 d) and 6.26 (6 d), while the 4:1 treatment had a ΔE of 2.89 (3 d) and 5.20 (6 d). The sodium bisulfite treatment at a 4:1 molar ratio also had little color change (5.70 at 3 d and 5.63 at 6 d), though there was a more pronounced color change when used at 2:1 molar levels (9.87 at 3 d and 15.1 at 6 d). Erythorbate was least effective at reducing color change regardless of concentration. ΔE values of erythorbate used at a 2:1 molar concentration were 14.4 (3 d) and 21.0 (6 d), and at a 4:1 molar concentration were slightly less at 13.0 (3 d) and 19.3 (6 d). These values are only slightly lower than those of the methylglyoxal-only treatment, but still a significant improvement in color.

The degree of browning inhibition was calculated based on a formula devised by Molnar-Perl and Friedman (1990), with ΔL replaced by ΔE:

% Inhibition of browning=$(\Delta E_{methylglyoxal} - \Delta E_{sample}) * 100 / \Delta E_{methylglyoxal}$ wherein ΔE describes the color change values, and $\Delta E_{methylglyoxal}$ refers to the color change of the positive browning condition (cheese and methylglyoxal without anti-browning agent). Sulfite used at a 2:1 concentration had 47.0% (3 d) and 35.7% (6 d) inhibition; sulfite used at a 4:1 concentration was much more effective, inhibiting color change by 69.9% (3 d) and 75.4% (6 d; Table 1). Because sulfite inhibits the browning more effectively at a 4:1 ratio than it does at a 2:1 ratio, it is possible that the irreversible formation of the thioketal molecule is necessary to inhibit methylglyoxal-based browning. See FIG. 2. Formation of the thiohemiketal intermediate would not fully prevent methylglyoxal-protein interaction; the thiohemiketal may either react with protein at its ketone group or dissociate back into its methylglyoxal and sulfite ion constituents due to the reversibility of its production (Friedman and Molnar-Perl, 1990). While not being bound to any underlying mechanism, higher concentration of substrate (4:1 as opposed to 2:1), favors the formation of the thiohemiketal intermediate and thus increases thioketal production. Furthermore, the higher sulfite concentration may also allow the second carbonyl group to form thiohemiketals and thioketals.

Unlike sodium bisulfite, glutathione was effective at inhibiting color change at both 2:1 and 4:1 molar ratios (Table 1). There were slightly higher levels of inhibition using glutathione at a 4:1 molar ratio (84.6% at 3 d and 77.6% at 6 d), and a slightly less, though still high level of inhibition (80.7% at 3 d and 72.9% at 6 d) at a 2:1 molar ratio. The greater inhibition at 4:1 levels again suggests that thioketal formation may be necessary for complete inhibition, though it appears to be less necessary for glutathione-based inhibition. The large size of the glutathione molecule may possibly cause steric hindrances when bonded to methylglyoxal, thus reducing browning to a greater extent than the smaller sulfite ion, reducing the need for thioketal formation or for reactions at the ketone carbon. Because glutathione is an intermediate in methylglyoxal metabolism in vivo (FIG. 1; Silva, Ferreira, Tomás, Corderio & Freire, 2005), its availability may further prevent browning by decreasing the concentration of methylglyoxal produced by starter cultures.

Erythorbate was the least effective anti-browning agent based on its inhibition values. Though erythorbate exhibited some browning-inhibiting activity at both 2:1 (22.0% at 3 d and 6.19% at 6 d) and 4:1 (30.1% at 3 d and 14.1% at 6 d) molar concentrations, there was a very large variance in the results. This was likely due to biological differences in the samples. It was observed that erythorbate was least effective on the raw milk Parmesan cheese. Erythorbate-treated samples did, however, display a significantly significant reduction in browning as compared to the methylgloxal-treated samples. There are likely several reasons as to why erythorbate may be a less effective anti-browning compound. One could be that its mechanism for methylglyoxal inactivation is reversible, and thus potentially preventing the formation of brown pigmentation for only a short time. Furthermore, erythorbate is unable to form the strong thiohemiketal and thioketal bonds that prevent browning in the putative sulfite and glutathione mechanisms (FIG. 2).

The example noted above used 2 mg/g of methylglyoxal to accelerate the rate of browning; however, 1/1000 of that concentration has been shown to typically cause browning in aging cheese over 1 mo (2 to 3.5 μg/g methylglyoxal; McDonald, 1992). Therefore, anti-browning agents can be used at 1/1000 of the concentration used in these studies. For both sulfite and glutathione, an approximate molar ratio of 4:1 (anti-browning agent to methylglyoxal) was determined to be highly effective at inhibiting the formation of brown pigmentation in cheese. This corresponds to approximately 20 μg/g of sodium bisulfite and around 60 μg/g of glutathione. Both of these compounds are generally regarded as safe (GRAS) according to the FDA. Sulfites are regulated more specifically, and may not be used at levels over 200 ppm (μg/g) in dairy products (Foulk, 1993), which is higher than the reported 20 ppm necessary for complete browning inhibition.

REFERENCES

Booth, I. R., G. P. Ferguson, S. Miller, C. Li, B. Gunasekera, and S. Kinghorn. (2003). Bacterial production of methylglyoxal: a survival strategy or death by misadventure? *Biochemical Society Transactions*, 31, 1406-1408.

Divine, R. D., D. Sommer, A. Lopez-Hernandez, and S. A. Rankin. (2012). *Short communication*: Evidence for methylglyoxal-mediated browning of Parmesan cheese during low temperature storage. *Journal of Dairy Science*, 95, 2347-2354.

Foulk, J. E. (1993). A fresh look at food preservatives. In J. L. Willis (Ed.), *FDA Consumer* (pp. 22-27). Rockville, Md.: Food and Drug Administration.

Friedman, M. (1996). Food browning and its prevention: an overview. *Journal of Agricultural and Food Chemistry*, 44, 631-653.

Friedman, M., and I. Molnar-Perl. (1990). Inhibition of browning by sulfur amino acids 1. Heated amino acid-glucose systems. *Journal of Agricultural and Food Chemistry*, 38, 1642-1647.

Jackson, S. F., C. O. Chichester, and M. A. Joslyn. (1960). The browning of ascorbic acid. *Journal of Food Science*, 25, 484-490.

Isaac, A., C. Livingstone, A. J. Wain, R. G. Compton, and J. Davis. (2006). Electroanalytical methods for the determination of sulfite in food and beverages. *Trends in Analytical Chemistry*, 25, 589-598.

Kalapos, M. K. (1994). Methylglyoxal toxicity in mammals. *Toxicology*, 73, 3-24.

McDonald, S. T. (1992). *Role of a-dicarbonyl compounds produced by lactic acid bacteria on the flavor and color of cheeses*. (Doctoral dissertation). Retrieved from University of Wisconsin, Madison.

Molnar-Perl, I., and M. Friedman. (1990). Inhibition of browning by sulfur amino acids. 2. Fruit juices and protein-containing foods. *Journal of Agriculture and Food Chemistry*, 38, 1648-1651.

Russel, J. B. (1998). Strategies that ruminal bacteria use to handle excess carbohydrate. *Journal of Animal Science*, 76, 1955-1963.

Silva, M. S., A. E. N. Ferreira, A. M. Tomás, C. Cordeiro, A. P. Freire. (2005). Quantitative assessment of the glyoxalase pathway in *Leishmania infantum* as a therapeutic target by modeling and computer simulation. *FEBS Journal*, 272, 2388-2398.

What is claimed is:

1. A method to inhibit browning in aged cheeses, the method comprising adding to a cheese during its manufacture an amount of a reducing agent, wherein the amount is effective to inhibit methylglyoxal-mediated browning of the cheese, then aging the cheese, wherein the cheese is selected from the group consisting of Asiago, Grana Padano, Parmesan, and Romano.

2. The method of claim 1, wherein the reducing agent is added to the cheese in an amount of from about 1 µg to about 500 µg of reducing agent per g of cheese.

3. The method of claim 1, wherein the reducing agent is added to the cheese in an amount of from about 1 µg to about 250 µg of reducing agent per g of cheese.

4. The method of claim 1, wherein the reducing agent is added to the cheese in an amount of from about 1 µg to about 200 µg of reducing agent per g of cheese.

5. The method of claim 1, wherein the reducing agent is added to the cheese in an amount of from about 1 µg to about 100 µg of reducing agent per g of cheese.

6. The method of claim 1, wherein the reducing agent contains at least one sulfur atom.

7. The method of claim 1, wherein the reducing agent is a thiol.

8. The method of claim 1, wherein the reducing agent is selected from the group consisting of glutathione, sodium sulphite, sodium bisulphite (sodium hydrogen sulphite), sodium metabisulphite, potassium metabisulphite, potassium sulphite, calcium sulphite, calcium hydrogen sulphite, potassium hydrogen sulphite, and sodium thiosulphate.

9. The method of claim 8, wherein the reducing agent is added to the cheese in an amount of from about 1 µg to about 500 µg of reducing agent per g of cheese.

10. The method of claim 8, wherein the reducing agent is added to the cheese in an amount of from about 1 µg to about 250 µg of reducing agent per g of cheese.

11. The method of claim 8, wherein the reducing agent is added to the cheese in an amount of from about 1 µg to about 200 µg of reducing agent per g of cheese.

12. The method of claim 8, wherein the reducing agent is added to the cheese in an amount of from about 1 µg to about 100 µg of reducing agent per g of cheese.

13. A method to inhibit browning in aged cheeses, the method comprising adding to a cheese during its manufacture an amount of a reducing agent, then aging the cheese, wherein the amount is effective to inhibit methylglyoxal-mediated browning of the cheese, and wherein the reducing agent has an E number of from E300 to E399, wherein the cheese is selected from the group consisting of Asiago, Grana Padano, Parmesan, and Romano.

14. The method of claim 13, wherein the reducing agent is added to the cheese in an amount of from about 1 µg to about 500 µg of reducing agent per g of cheese.

15. The method of claim 13, wherein the reducing agent is added to the cheese in an amount of from about 1 µg to about 250 µg of reducing agent per g of cheese.

16. The method of claim 13, wherein the reducing agent is added to the cheese in an amount of from about 1 µg to about 200 µg of reducing agent per g of cheese.

17. The method of claim 13, wherein the reducing agent is added to the cheese in an amount of from about 1 µg to about 100 µg of reducing agent per g of cheese.

* * * * *